(12) United States Patent
Book

(10) Patent No.: US 7,934,531 B2
(45) Date of Patent: May 3, 2011

(54) METHOD AND APPARATUS FOR APPLYING HEAT ACTIVATED TRANSFER ADHESIVES

(75) Inventor: Alf Martin Book, Torslanda (SE)

(73) Assignee: Brady Worldwide, Inc., Milwaukee, WI (US)

( * ) Notice: Subject to any disclaimer, the term of this patent is extended or adjusted under 35 U.S.C. 154(b) by 321 days.

(21) Appl. No.: 12/105,787

(22) Filed: Apr. 18, 2008

(65) Prior Publication Data

US 2009/0260756 A1 Oct. 22, 2009

(51) Int. Cl.
*B29C 65/02* (2006.01)
*B29C 65/18* (2006.01)
*B29C 65/52* (2006.01)
*B32B 37/06* (2006.01)
*B32B 37/02* (2006.01)
*B32B 37/14* (2006.01)
*B30B 7/00* (2006.01)
*B29C 65/24* (2006.01)
*B32B 38/18* (2006.01)
*B30B 7/04* (2006.01)

(52) U.S. Cl. ........ 156/547; 156/230; 156/247; 156/295; 156/538; 156/583.1

(58) Field of Classification Search ............ 156/230, 156/247, 248, 250, 289, 295, 210, 538, 547, 156/583.1
See application file for complete search history.

(56) References Cited

U.S. PATENT DOCUMENTS

| 4,339,485 | A | * | 7/1982 | Shibano et al. ............. 428/41.3 |
| 4,824,702 | A | | 4/1989 | Straub |
| 5,304,272 | A | * | 4/1994 | Rohrbacker et al. .......... 156/209 |
| 5,589,246 | A | | 12/1996 | Calhoun et al. |
| 5,591,290 | A | * | 1/1997 | Walter et al. .................. 156/152 |

(Continued)

FOREIGN PATENT DOCUMENTS

EP 1475424 A1 * 11/2004

(Continued)

OTHER PUBLICATIONS

English Translation of EP1475424. Konstanzer, Martin. Nov. 10, 2004.*
International Search Report; PCT/US2009/040602; Sep. 15, 2009; 3 pages.

*Primary Examiner* — Philip Tucker
*Assistant Examiner* — Sonya Mazumdar
(74) *Attorney, Agent, or Firm* — Quarles & Brady LLP

(57) ABSTRACT

A method for applying a heat activated transfer adhesive includes preheating a first part for bonding to a second part using a heat activated transfer adhesive form removably adhered to a liner, picking up the heat activated transfer adhesive form using the first part by pressing the preheated first part against the heat activated transfer adhesive form to adhere the heat activated transfer adhesive form to the first part, removing the liner from the heat activated transfer adhesive form adhered to the first part, heating the heat activated transfer adhesive form adhered to the first part, and pressing the heated heat activated transfer adhesive form on the first part against a second part to bond the first part to the second part.

9 Claims, 2 Drawing Sheets

U.S. PATENT DOCUMENTS

| | | | | |
|---|---|---|---|---|
| 5,738,748 | A * | 4/1998 | Mitchell, Jr. | 156/253 |
| 5,868,891 | A * | 2/1999 | Weir et al. | 156/230 |
| 5,972,152 | A * | 10/1999 | Lake et al. | 156/247 |
| 6,042,678 | A * | 3/2000 | Johnson et al. | 156/246 |
| 6,113,725 | A * | 9/2000 | Kronzer | 156/230 |
| 6,284,074 | B1 * | 9/2001 | Braund et al. | 156/64 |
| 6,765,123 | B2 * | 7/2004 | de Jong et al. | 602/56 |
| 6,852,191 | B2 * | 2/2005 | Bayzelon et al. | 156/289 |
| 2003/0178121 | A1 * | 9/2003 | Hopkins et al. | 156/71 |
| 2006/0269743 | A1 | 11/2006 | Husemann et al. | |
| 2006/0276591 | A1 | 12/2006 | Husemann et al. | |
| 2008/0196831 | A1 * | 8/2008 | Friese et al. | 156/295 |

FOREIGN PATENT DOCUMENTS

| | | |
|---|---|---|
| EP | 1956063 A2 | 8/2008 |
| WO | 2004027537 A2 | 4/2004 |
| WO | 2007006633 A1 | 1/2007 |

\* cited by examiner

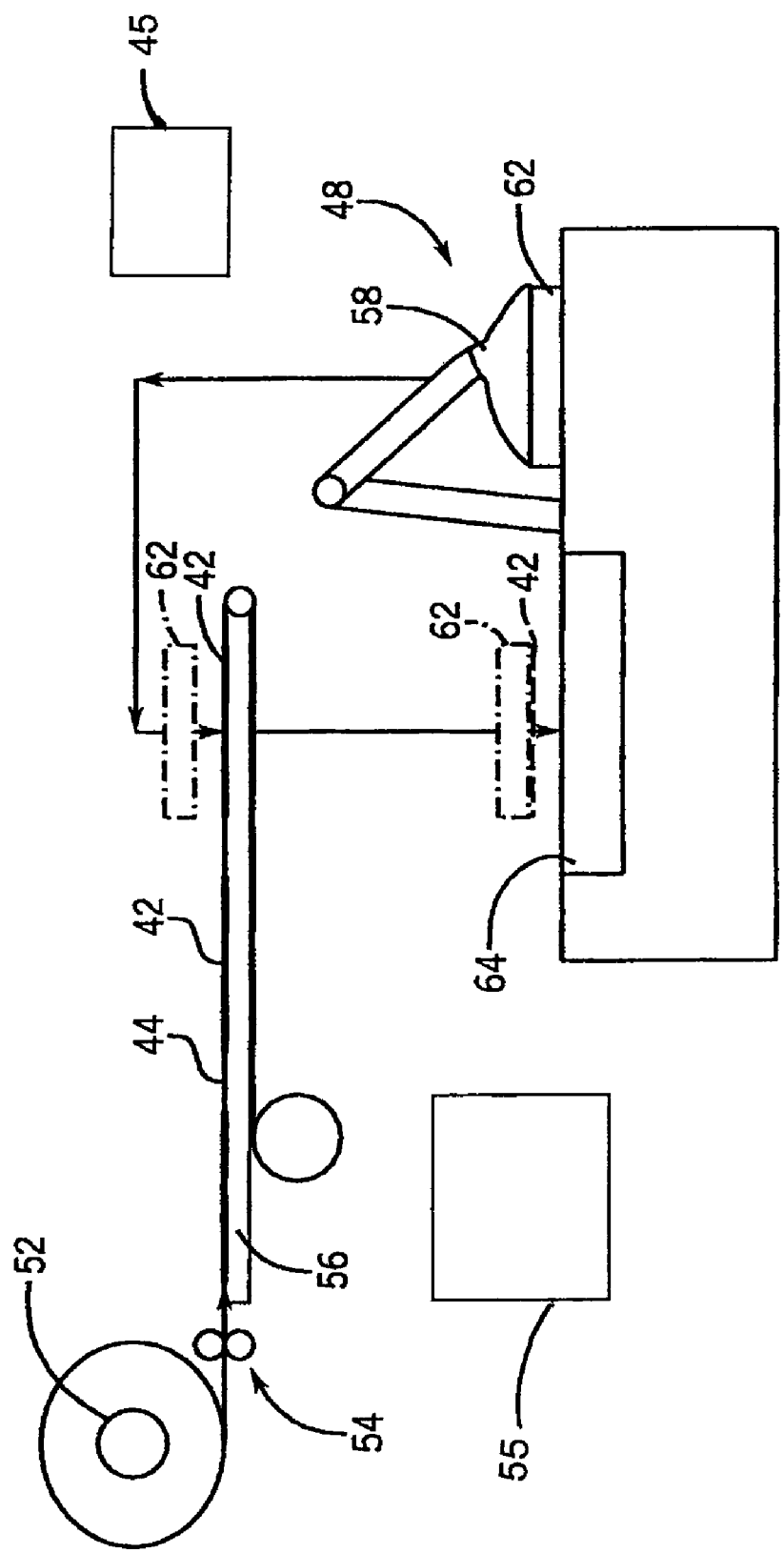

METHOD AND APPARATUS FOR APPLYING HEAT ACTIVATED TRANSFER ADHESIVES

CROSS REFERENCES TO RELATED APPLICATIONS

Not Applicable.

STATEMENT REGARDING FEDERALLY SPONSORED RESEARCH

Not Applicable.

TECHNICAL FIELD

The present invention relates to the application of heat activated transfer adhesives, and more particularly to a method and apparatus for applying heat activated transfer adhesives.

DESCRIPTION OF THE BACKGROUND ART

Heat activated transfer adhesives, such as thermosetting adhesives available from 3M, St. Paul Minn., are used to bond components of an electrical device together. The thermosetting adhesive is removably fixed to a liner which is wound into roll form. The adhesive is typically unwound and die cut piece by piece into adhesive forms. Each form is then handled manually in two smaller assembly machines, one for pre bonding and one for bonding, this requires two operators manually loading the machines with the adhesive form and parts being bonded together. Handling each adhesive form and part is very time consuming.

In a typical operation, an operator places a first part being bonded into the first machine or fixture, and the adhesive form is aligned and adhered to the one part with the liner facing outwardly. The liner is then removed and the first part is placed into the second machine with a second part. The second machine applies predetermined heat and pressure over a specific time to activate the adhesive and bond the first and second parts together. The process is manual, time consuming, cannot handle die cut parts on a reel well, and can create a lot of waste material.

In addition, when handling the parts and adhesive form manually, guiding features are required in the adhesive liner or the parts themselves to position the adhesive form relative to the parts. The guiding features typically include guiding holes in the liner. The guiding holes can result in usage of more materials since they need to be placed outside the actual part in many cases.

SUMMARY OF THE INVENTION

The present invention provides a method and apparatus for applying a heat activated transfer adhesive. The method includes preheating a first part for bonding to a second part using a heat activated transfer adhesive form removably adhered to a liner, picking up the heat activated transfer adhesive form using the first part by pressing the preheated first part against the heat activated transfer adhesive form to adhere the heat activated transfer adhesive form to the first part, removing the liner from the heat activated transfer adhesive form adhered to the first part, heating the heat activated transfer adhesive form adhered to the first part, and pressing the heated heat activated transfer adhesive form on the first part against a second part to bond the first part to the second part.

The preferred apparatus for accomplishing the method includes a first heat source preheating a first part for bonding to a second part using a heat activated transfer adhesive form removably adhered to a liner, a pick head picking up the heat activated transfer adhesive form liner using a first part by pressing the first part against the heated heat activated transfer adhesive form to adhere the heat activated transfer adhesive form to the first part, and a second heat source heating the heat activated transfer adhesive form adhered to the first part prior to pressing the heated heat activated transfer adhesive form on the first part against a second part to bond the first part to the second part.

A general objective of the present invention is to provide an efficient method and apparatus for bonding two parts using a heat activated transfer adhesive. This objective is accomplished by heating a heat activated adhesive adhered to the first part prior to pressing the heat activated adhesive against the second part to bond the first part to the second part.

The foregoing and other objectives and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 2 is a diagrammatical view of an apparatus incorporating the present invention for applying a heat activated transfer adhesive incorporating the present invention.

DETAILED DESCRIPTION OF THE PREFERRED EMBODIMENTS

Figure 1:
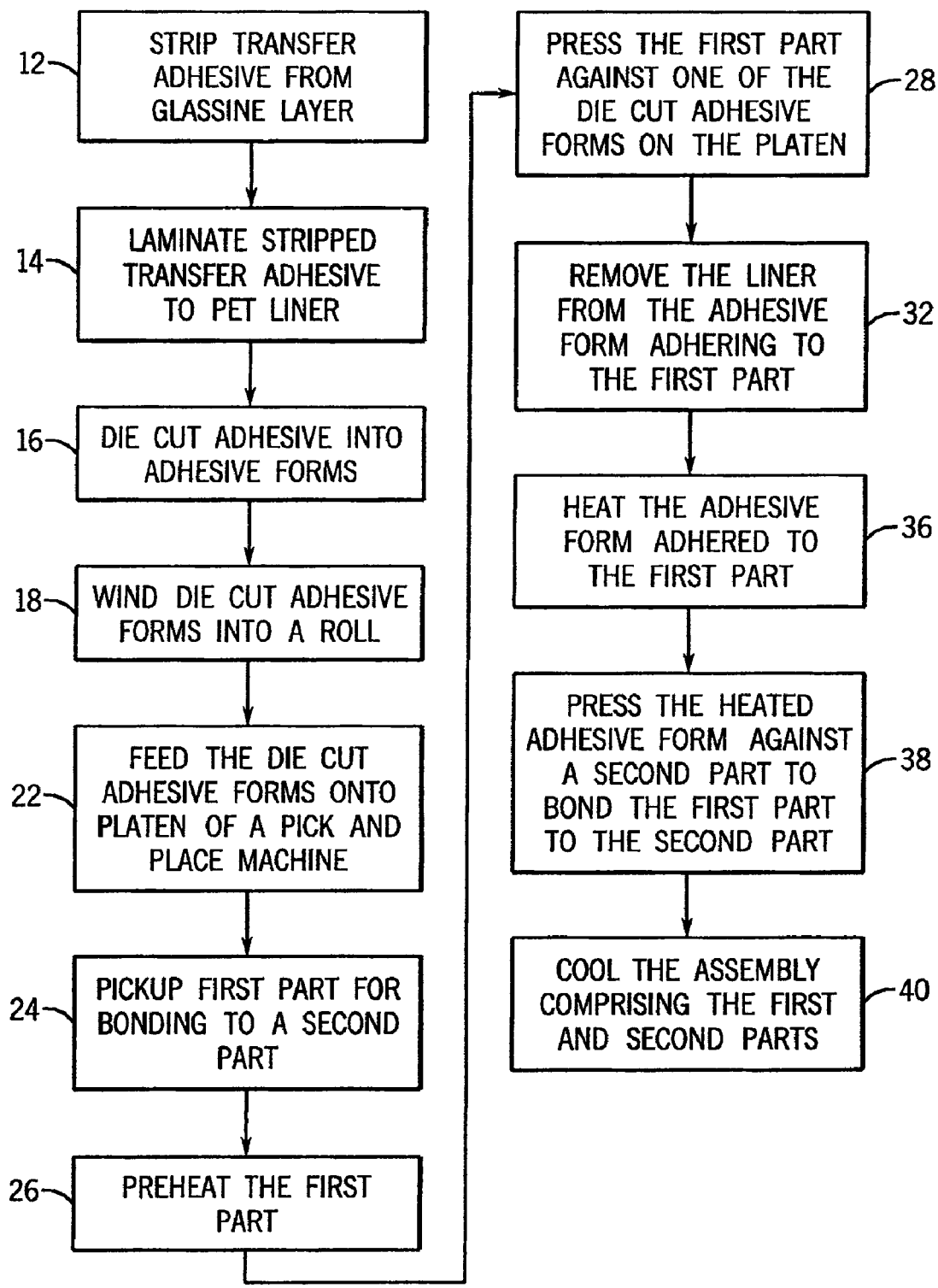
FIG. 1 is a flow chart for a method of applying a heat activated transfer adhesive incorporating the present invention.

A method of applying a heat activated transfer adhesive incorporating the present invention bonds two parts together faster than the prior art. Advantageously, the method disclosed herein is especially suited for implementation through automated equipment that quickly and accurately bonds two parts together with minimal waste.

The method shown in FIG. 1 preferably consumes die cut forms of heat activated transfer adhesive. In one embodiment described below with reference to FIGS. 1 and 2, the heat activated transfer adhesive, such as an epoxy film adhesive available from 3M, St. Paul, Minn., is stripped from a glassine liner and laminated to a polyethylene terephthalate (PET) liner 44 in steps 12 and 14 of FIG. 1. The adhesive and PET liner 44 are then die cut into adhesive forms 42 in step 16 using a rotary die cutter. Transferring the adhesive to the PET liner 44 is preferred when die cutting the adhesive into adhesive forms 42 because the PET liner 44 is more easily die cut. However, any liner, such as a glassine liner, can be used without departing from the scope of the invention. Moreover, the adhesive and/or adhesive forms 42 can be provided without a liner without departing from the scope of the claims.

The die cut adhesive forms 42 and liner 44 are then wound in roll form in step 18 to simplify dispensing and handling the adhesive forms 42 in an automatic pick and place machine incorporating steps of the present invention. Although winding the forms 42 and liner 44 into roll form is preferred, the adhesive forms 42 can be provided in any form, such as sheet form, individually, and the like, in which individual adhesive forms can be applied to a part.

In the preferred embodiment, as shown in FIG. 2, the roll of die cut adhesive forms 42 is placed onto an automatic pick and place machine 48 incorporating the present invention in step 22. The pick and place machine 48 includes a spool 52 which receives the roll of die cut adhesive forms 42. A drive system 54, such as a drive roller engaging the die cut adhesive forms, a drive motor rotatably driving the spool, and the like, accurately advances each die cut adhesive form 42 onto a platen 56.

The platen 56 supports the adhesive form 42 in position for being picked up. The adhesive form 42 is positioned on the platen 56 with the liner 44 facing the platen 56 to prevent the adhesive form 42 from adhering to the platen 56. In one embodiment, the platen 56 is heated to preheat the adhesive form 42 prior to being picked up by a vacuum pick head 58 forming part of the automatic pick and place machine 48. However, heating the platen 56 or even preheating the adhesive form 42 prior to being picked up by the head 58 is not required to practice the invention. Moreover, although a vacuum, or pneumatic, head is disclosed, the head 58 could pick up the adhesive form 42 using mechanical actuator, such as a robotic actuator or a servo driven unit, without departing from the scope of the claims.

The heated vacuum head 58 picks up a first part 62, such as a metallic part of an electronic device from an inventory of first parts in step 24. The head 58 is a first heat source that preheats the first part 62 in step 26, aligns the first part 62 with the adhesive form 42 on the platen 56, and then presses the preheated first part 62 against the adhesive form 42 on the platen 56 in step 28 to bond the adhesive form 42 to the first part 62.

Once the adhesive form 42 is bonded to the first part 62, the liner 44 is removed from the adhesive form 42 bonded to the first part 62 in step 32. This is accomplished in one embodiment by the head 58 lifting the first part 62 and adhesive form 42 bonded thereto away from the platen 56. If the liner 44 is die cut, the liner 44 is lifted with the adhesive form 42, and then stripped away prior to engaging the adhesive form 42 with a second part 64, such as a plastic inner housing of the electronic device. In a preferred embodiment, the liner 44 is not completely die cut, and lifting the first part 62 and adhesive form 42 bonded thereto strips the adhesive form 42 from the liner 44 which remains on the platen 56. Of course, the liner 44 can be separated from the adhesive form 42 bonded to the first part 62 using any methods without departing from the scope of the invention.

In the preferred embodiment, the heated head 58 continues to heat the first part 62 which forms a second heat source that heats the adhesive form 42 adhered thereto in step 36. As the adhesive form 42 is heated by the heated first part 62, the heated first part 62 and adhesive form 42 are positioned over the second part 64. Once the first part 62 and adhesive form 42 are properly positioned relative to the second part 64, using methods known in the art such as fixtures, machine vision, and the like, the heated adhesive form 42 is pressed into engagement with the second part 64 to bond the first part 62 to the second part 64 in step 38.

Although a heated head 58 is preferred for heating the first part 62 to heat the adhesive form 42, other methods for heating the adhesive form 42 prior to engaging the heated adhesive form 42 with the second part 64 can be used without departing from the scope of the invention. For example, the head 58 having the first part 62 with or without the adhesive form 42 fixed thereto can be passed over a fixed heat source 45, such as a forced air heater or radiant heater, to heat the first part 62 and/or the adhesive form 42. The fixed heat source 45 can act as a first heat source preheating the first part 62 when the adhesive form 42 is not fixed to the first part 62 and a second heat source when the adhesive form 42 is fixed to the first part 62.

Preferably, once the first part 62 and second part 64 are bonded together by the adhesive form 42, the adhesive form 42 is cooled by a cooling source 55, such as by directing a stream of cooled air toward the assembly comprising the first and second parts 62, 64 bonded together by the adhesive form 42 in step 40. Of course, other methods of cooling the adhesive can be accomplished, such as by placing the assembly in a cooling chamber, contacting a heat conductive part of the assembly with a cool surface, cooling the head 58 to cool the adhesive form 46, and the like, without departing from the scope of the invention.

The method described herein can be performed using a single position/fixture apparatus as described. Alternatively, the steps can be performed simultaneously using a rotary table or palette where heating and/or cooling steps are performed at different stations at the same time without departing from the scope of the invention.

While there has been shown and described what is at present considered the preferred embodiment of the invention, it will be obvious to those skilled in the art that various changes and modifications can be made therein without departing from the scope of the invention defined by the appended claims.

I claim:

1. An apparatus for applying a heat activated transfer adhesive, said apparatus comprising:
   a first heat source preheating a first part for bonding to a second part using a heat activated transfer adhesive form removably adhered to a liner;
   a pick head picking up said heat activated transfer adhesive form liner by picking up said first part and pressing said first part against said heat activated transfer adhesive form to adhere said heat activated transfer adhesive form to said first part; and
   a second heat source heating said heat activated transfer adhesive form adhered to said first part prior to pressing said heated heat activated transfer adhesive form on said first part against a second part to bond said first part to said second part,
   in which said first heat source forms part of said pick head, said first heat source preheating said first part which forms part of said second heat source which heats said heat activated transfer adhesive form.

2. The apparatus as in claim 1, in which said first part includes metal, and said metal is heated to heat said heat activated transfer adhesive form adhered to said first part.

3. The apparatus as in claim 1, in which said second heat source directs heat toward said heat activated transfer adhesive form to heat said heat activated transfer adhesive form adhered to said first part.

4. The apparatus as in claim 3, in which said second heat source directs heated air at said heat activated transfer adhesive form.

5. The apparatus as in claim 3, in which said second heat source is a radiant heat source.

6. The apparatus as in claim 1, in which said heat activated transfer adhesive form is die cut.

7. The apparatus as in claim 1, including a spool for receiving a plurality of heat activated transfer adhesive forms in the form of a roll.

8. The apparatus as in claim 1, including a cooling source which cools said heat activated transfer adhesive form adhering said first part to said second part.

9. The apparatus as in claim 1, in which said pick head is a vacuum head.

* * * * *